United States Patent
Wan et al.

(10) Patent No.: US 8,229,108 B2
(45) Date of Patent: Jul. 24, 2012

(54) PSEUDO-RANDOM NUMBER GENERATION BASED ON PERIODIC SAMPLING OF ONE OR MORE LINEAR FEEDBACK SHIFT REGISTERS

(75) Inventors: Wade Keith Wan, Irvine, CA (US); Sherman (Xuemin) Chen, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 2981 days.

(21) Appl. No.: 10/642,318

(22) Filed: Aug. 15, 2003

(65) Prior Publication Data

US 2005/0036607 A1 Feb. 17, 2005

(51) Int. Cl.
*G06F 21/00* (2006.01)
(52) U.S. Cl. .......................................... 380/28; 380/46
(58) Field of Classification Search .................. 380/265, 380/28, 46; 708/252, 250
See application file for complete search history.

(56) References Cited

U.S. PATENT DOCUMENTS

| | | | | |
|---|---|---|---|---|
| 4,484,027 A * | 11/1984 | Lee et al. | ....................... | 380/239 |
| 4,905,176 A * | 2/1990 | Schulz | ........................... | 708/252 |
| 5,327,522 A * | 7/1994 | Furuta et al. | .................... | 706/43 |
| 5,341,427 A * | 8/1994 | Hardy et al. | ................... | 380/273 |
| 6,201,870 B1 * | 3/2001 | Medard et al. | .................. | 380/46 |
| 6,417,794 B1 * | 7/2002 | Munoz et al. | ................. | 341/161 |
| 6,480,072 B1 * | 11/2002 | Walsh et al. | ..................... | 331/78 |
| 6,486,806 B1 * | 11/2002 | Munoz et al. | ................. | 341/120 |
| 6,560,338 B1 * | 5/2003 | Rose et al. | ...................... | 380/47 |
| 6,647,054 B1 * | 11/2003 | Greenhoe | ..................... | 375/140 |
| 6,879,689 B2 * | 4/2005 | Carroll et al. | ................... | 380/44 |
| 6,954,770 B1 * | 10/2005 | Carlson et al. | ................ | 708/251 |
| 6,993,542 B1 * | 1/2006 | Meiyappan | ..................... | 708/250 |
| 2002/0006197 A1 * | 1/2002 | Carroll et al. | .................... | 380/44 |
| 2002/0097703 A1 * | 7/2002 | Nieczyporowicz et al. | .. | 370/342 |
| 2003/0059045 A1 * | 3/2003 | Ruehle | ............................. | 380/46 |
| 2003/0072059 A1 * | 4/2003 | Thomas et al. | ............... | 359/167 |
| 2004/0049525 A1 * | 3/2004 | Hars | .............................. | 708/250 |
| 2004/0205095 A1 * | 10/2004 | Gressel et al. | ................ | 708/253 |
| 2005/0066168 A1 * | 3/2005 | Walmsley | ...................... | 713/169 |

OTHER PUBLICATIONS

U.S. Department of Commerce/National Institute of Standards and Technology, Digital Signature Standard (DSS), Federal Information Processing Standards Publication 186-2, Jan. 27, 2000, pp. 1-74, U.S.A.
Eastlake, Crocker, and Schiller, Network Working Group, Randomness Recommendations for Security, RFC 1750, Dec. 1994, pp. 1-30, U.S.A.

(Continued)

*Primary Examiner* — David Garcia Cervetti
(74) *Attorney, Agent, or Firm* — Thomas, Kayden, Horstemeyer & Risley, LLP

(57) ABSTRACT

One or more methods and systems of generating pseudo-random numbers that are used as encryption keys in cryptographic applications are presented. In one embodiment, a method of generating pseudo-random numbers is performed by sampling output sequences of a linear feedback shift register with a specified periodicity. In one embodiment, the generating of pseudo-random numbers using linear feedback shift registers is accomplished by periodically switching between iterative outputs generated by multiple linear feedback shift registers. In one embodiment, a method of encrypting a pseudo-random number generated by a linear feedback shift register comprises using a nonlinear operator. In one embodiment, a method of further encrypting a pseudo-random number is accomplished by using a hashing function whose initial value varies over time by way of a function operating on one or more variables. In one embodiment, an apparatus for generating pseudo-random numbers using linear feedback shift registers comprises a digital hardware.

7 Claims, 6 Drawing Sheets

OTHER PUBLICATIONS

Bernard Sklar, Digital Communications: Fundamentals and Applications (2nd edition), Prentice Hall PTR, 2001, p. 917, Upper Saddle River, New Jersey, U.S.A.

Digital Video Subcommittee, Society of Cable Telecommunications Engineers, ANSI/SCTE 41, POD Copy Protection System, 2001, pp. 1-62, Exton, Pennsylvania, U.S.A.

Henry Beker and Fred Piper, Cipher Systems, The Protection of Communications, A Wiley-Interscience Publication, John Wiley and Sons, hand numbered pp. 4-9, text numbered pp. 10-427, New York, U.S.A.

U.S. Department of Commerce/National Institute of Standards and Technology, Federal Information Processing Standards Publication 180-1, Announcing the Standard for Secure Hash Standard, Apr. 17, 1995, pp. 1-16, U.S.A.

* cited by examiner

Output of a 3-bit LFSR

| Iteration # | LFSR Outputs ($X_2X_1X_0$) |
|---|---|
| 1 | 011 |
| 2 | 001 |
| 3 | 100 |
| 4 | 010 |
| 5 | 101 |
| 6 | 110 |
| 7 | 111 |
| 8 | 011 |

Figure 1

Output of the same 3-bit LFSR used in
Figure 1 when it is sampled every 3 iterations

| Iteration # | LFSR Outputs ($X_2 X_1 X_0$) |
|---|---|
| 1 | 100 |
| 2 | 110 |
| 3 | 001 |
| 4 | 101 |
| 5 | 011 |
| 6 | 010 |
| 7 | 111 |
| 8 | 100 |

Figure 3

Output of periodic switching between two 3-bit LFSRs
when the switching is done after every iteration

| ITERATION | LFSR #1 | OUTPUT OF PERIODIC SWITCHING | LFSR #2 |
|---|---|---|---|
| 1 | 011 | 011 | |
| 2 | | 100 | 100 |
| 3 | 001 | 001 | |
| 4 | | 110 | 110 |
| 5 | 100 | 100 | |
| 6 | | 111 | 111 |
| 7 | 010 | 010 | |
| 8 | | 011 | 011 |
| 9 | 101 | 101 | |
| 10 | | 101 | 101 |
| 11 | 110 | 110 | |
| 12 | | 010 | 010 |
| 13 | 111 | 111 | |
| 14 | | 001 | 001 |
| 15 | 011 | 011 | |
| 16 | | 100 | 100 |

Figure 4

PSEUDO-RANDOM NUMBER GENERATION BASED ON PERIODIC SAMPLING OF ONE OR MORE LINEAR FEEDBACK SHIFT REGISTERS

RELATED APPLICATIONS

[Not Applicable]

INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Because data, such as human readable data, is readily accessible to individuals over a public transport media such as the Internet, various techniques have been devised to protect unauthorized use of human readable data and to insure proper functioning of cryptographic applications. One or more algorithms may be employed to encrypt the data prior to its transmission or storage. The encrypted data may be read by the desired individual(s) by using a corresponding encryption key or seed value. The encryption key may be generated by a pseudo-random number generator (PRNG). If the encryption key is provided only to authorized parties and if the encryption algorithm is sufficiently complex, unauthorized access may be prevented. Often, however, the encryption key may be deciphered by a hacker or cryptanalyst.

One drawback in generating secure encryption keys relates to the statistical properties of the pseudo-random number generator (PRNG). Often enough, the generated key space is too small allowing a cryptanalyst to successfully determine an appropriate key using one or more search algorithms.

Another drawback relates to the relative ease in determining an encryption key based on deciphering one or more parameters of an algorithm. For example, a cryptanalyst may often find it easier to examine the smaller space of algorithm parameters. Often, one or more internal parameters may be deciphered and used to formulate the algorithm. Many key encryption algorithms are prone to being easily deciphered by a cryptanalyst's observation of the behavior of one or more internal parameters. For example, a periodic occurrence of a particular outcome within a sample space may allow a cryptanalyst to decode one or more parameters contributory to the design of the algorithm.

Another area of concern relates to the difficulty required in implementing a desirably secure PRNG. Because of its simplicity, PRNGs are often implemented using linear feedback shift registers (LFSRs); however, such implementations are very vulnerable to attack. Direct application of a LFSR to generate pseudo-random numbers would implement an algorithm that is vulnerable to attack.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention provide for a method, system and/or apparatus to generate pseudo-random numbers that are used as encryption keys or seed values in cryptographic applications. The pseudo-random number generator (PRNG) is implemented using one or more linear feedback shift registers (LFSR) that employ a number of techniques to conceal the behavior of its internal parameters.

In one embodiment, a method of generating pseudo-random numbers is performed by sampling output sequences of a linear feedback shift register with a specified periodicity. In one embodiment, the linear feedback shift register generates said output sequences corresponding to maximal length sequences. In one embodiment, the specified periodicity is equal to the number of bits output by said linear feedback shift register.

In one embodiment, a generating of pseudo-random numbers using linear feedback shift registers in which the correlation between successive pseudo-random numbers is reduced, is accomplished by periodically switching between iterative outputs generated by at least a first linear feedback shift register and iterative outputs generated by at least a second linear feedback shift register.

In one embodiment, a method of encrypting a pseudo-random number generated by a linear feedback shift register comprises using a nonlinear operator to operate on the pseudo-random number and one or more operands. The nonlinear operator may comprise an XOR function. In another embodiment, the one or more operands comprise a unique bit sequence corresponding to the LFSR currently used to generate the pseudo-random number.

In one embodiment, a method of further encrypting a pseudo-random number generated from a linear feedback shift register by using a hashing function is accomplished by receiving the pseudo-random number generated from the linear feedback shift register and varying the initial value of the hashing function over time by way of a function operating on one or more variables. The one or more variables may comprise, for example, a configuration of feedback taps associated with the linear feedback shift register used to generate the pseudo-random number.

In one embodiment, an apparatus for generating pseudo-random numbers using linear feedback shift registers comprises a digital hardware. In one embodiment, the digital hardware comprises flip-flops and gates.

These and other advantages, aspects, and novel features of the present invention, as well as details of illustrated embodiments, thereof, will be more fully understood from the following description and drawings.

BRIEF DESCRIPTION OF THE DRAWINGS

FIG. 1 illustrates outputs corresponding to an exemplary 3 bit linear feedback shift register (LFSR) in accordance with an embodiment of the invention.

FIG. 3 illustrates outputs of a PRNG corresponding to an exemplary n=3 bit linear feedback shift register (LFSR), in which the LFSR outputs are sampled every n=3 iterations in accordance with an embodiment of the invention.

FIG. 4 illustrates outputs of a PRNG employing periodic switching between outputs of at least a first LFSR to outputs of at least a second LFSR in accordance with an embodiment of the invention.

DETAILED DESCRIPTION OF THE INVENTION

Aspects of the present invention may be found in a system and method to generate pseudo-random numbers that are used as encryption keys or seed values in cryptographic applications. The pseudo-random number generator (PRNG) is implemented using one or more linear feedback shift registers (LFSR) that employ a number of techniques to conceal the behavior of its internal parameters or its underlying algorithm. In one embodiment, the outputs of an LFSR are sampled periodically, instead of consecutively at the next iteration, to determine the encryption keys used in the cryptographic application. In one embodiment, the one or more distinct LFSRs are switched periodically after a number of iterations, wherein each of the one or more distinct LFSRs is differentiated by a unique set of feedback parameters or taps. In one embodiment, nonlinear operators are used to map encryption keys generated by a LFSRs to outputs to make it more difficult for a cryptanalyst to decipher the algorithm used in the encryption process. In one embodiment, the configuration of the feedback parameters or taps of a LFSRs are used to determine the initial value of a hashing function used to further encrypt the output generated by the LFSR.

FIG. 1 illustrates encryption key outputs corresponding to an exemplary linear feedback shift register (LFSR) in which the LFSR generates a three bit output (n=3) in accordance with an embodiment of the invention. As illustrated there are a total of seven different outputs corresponding to iterations 1 through 7 for this 3 bit LFSR. Note that an initial value of (111) is used to generate the table and that the configuration shown provides a maximal length sequence, having periodicity, 7. A LFSR of any given size n (corresponding to the number of registers in the LFSR) is capable of producing every possible state (except the all zero state) during the period $p=2^n-1$, but will do so only if one or more feedback taps are properly configured, as will be discussed shortly.

Figure 2:
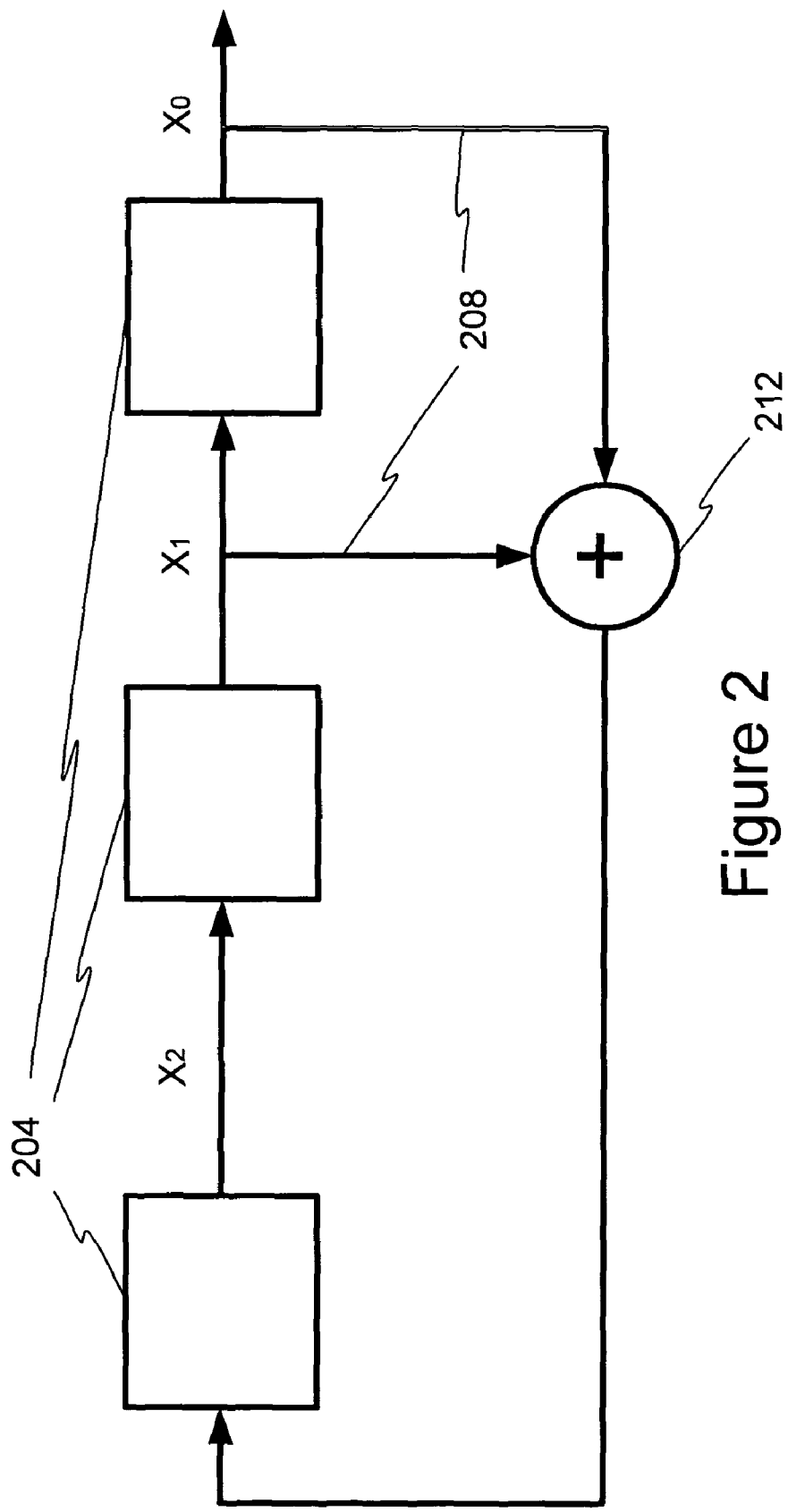
FIG. 2 illustrates a functional block diagram of a system used to generate the encryption key outputs shown in FIG. 1 in accordance with an embodiment of the invention.

FIG. 2 illustrates a functional block diagram of a system used to generate the encryption key outputs shown in FIG. 1 in accordance with an embodiment of the invention. In the embodiment shown, the LFSR outputs $(X_2 X_1 X_0)$ are binary digits generated from an n stage LFSR 204, in which n=3 for example. As shown, the LFSR 204 utilizes feedback taps 208 originating at bit 0 (least significant bit, LSB) and at bit 1 (next significant bit), in which the bit ordering is from a least significant bit, LSB $(X_0)$ to a most significant bit, MSB, $X_2$. The feedback taps may be designated by way of a triplet $P_f=(P_2, P_1, P_0)$, which in this embodiment equals (0, 1, 1). The feedback taps 208 are modulo-2 summed by an exemplary summing device 212 and the sum is fed back to the input of the register corresponding to the MSB, $X_2$. An implementation of the functional block diagram of FIG. 2 may be easily implemented by way of digital hardware. In one embodiment, the hardware may comprise one or more exemplary flip-flops and gates. The gates may be configured to implement an appropriate feedback tap configuration for the LFSR 204.

The popularity of using a LFSR to implement a PRNG is due in part to its relatively simple implementation and with the right choice of feedback taps, the outputs may generate a maximal length sequence, having outputs characterized by periodicity, $p=2^n-1$, where the value n corresponds to the number of registers or the number of bits generated by the LFSR. However, by examining the structure of a LFSR, one may demonstrate an obvious potential problem with its use in providing secure applications. It may be easily discerned by examining consecutive outputs of a LFSR that the MSB of each output is a binary-weighted modulo-2 sum of the feedback taps and the remaining bits are computed by simply shifting the previous encryption key to the right by one bit.

A cryptanalyst may easily identify that the algorithm is implemented by a LFSR by simple observation of the outputs shown in FIG. 1. An analysis of possible feedback taps using assistance provided by past key encryption values may easily compromise the structure of the feedback taps.

FIG. 3 illustrates outputs of a PRNG corresponding to an exemplary n=3 bit linear feedback shift register (LFSR), in which the LFSR outputs are sampled every n=3 iterations in accordance with an embodiment of the invention. The results of periodic sampling every n iterations is illustrated in FIG. 3, in which the LFSR shown in FIG. 1 is used and the iterations commence from an initial starting value of (111). As one may see, the use of periodic sampling reduces the correlation between consecutive or successive outputs of an LFSR.

There are advantages to sampling the LFSR output sequence with periodicity equal to n=3. If an n-bit LFSR is sampled once every n iterations then the maximal length properties of its output sequence will be preserved. In addition, sampling once every n iterations prevents revealing the underlying shifting of bits of an LFSR structure, since all n bits related to an encryption key will be processed before the next encryption key is generated. Note that the simplistic implementation of the underlying LFSR is preserved while periodic sampling of the LFSR outputs reduces a cryptanalyst's ability to correlate outputs between consecutive iterations. Although FIG. 3 provides an embodiment of a 3 bit LFSR implementation in which outputs are sampled every 3 iterations, it is contemplated that other embodiments may be implemented using a n bit LFSR where n≠3, in which the output sequence is sampled every n iterations. It is further contemplated that other embodiments may be implemented using an n bit LFSR, in which the output sequence may be sampled with period L, for which L≠n.

FIG. 4 illustrates outputs of a PRNG employing periodic switching between iterative outputs generated by at least a first LFSR and iterative outputs generated by at least a second LFSR in accordance with an embodiment of the invention. The switching is performed after a specified number of iterations. In embodiments with multiple LFSRs, the switching is performed sequentially from one LFSR to the next as will be described later in FIG. 5. Referring to the table shown in FIG. 4, the embodiment illustrates switching performed between two exemplary LFSRs. The first LFSR corresponds to the implementation illustrated and previously described in FIG. 2. The second LFSR corresponds to a LFSR having feedback taps at bit 0 (LSB) and bit 2 (MSB). For the second LFSR, the feedback taps, again, are modulo-2 summed and fed back to the input of the register corresponding to the MSB, $X_2$. In addition to the periodic sampling technique described in the embodiment of FIG. 3, the switching technique shown in the embodiment of FIG. 4 may foil a hacker's attempts to search the sample space of possible parameter taps of an LFSR. Because, the sample space of parameter taps is often smaller than that corresponding to the sample space of possible encryption keys, a hacker or cryptanalyst may pose a threat if he possesses knowledge of some of the parameters taps or encryption keys. Referring to FIG. 4, a simple method to further thwart a cryptanalyst is to continuously switch between LFSRs so that a hacker will be unable to determine an algorithm (that is easily discernible when using a single LFSR). By carefully switching between one or more LFSRs, each configured using M distinct sets of feedback taps, it may be possible to obtain an overall combined output sequence that is periodic with period $M*(2^n-1)$. The resulting sequence would also have a distribution that is nearly white (or near random) if all the possible values, except the all zero sequence (000), are generated in one period. One configures the M different sets of feedback taps such that each LFSR generates a maximal length sequence, thereby assuring that the output over all LFSRs comprises a nearly white sequence. The only other requirement is that a complete period over the entire set of LFSRs is traversed once and only once every $M*(2^n-1)$ iterations. There are many ways to accomplish this, but a simple implementation might be to switch from a LFSR (characterized by distinct sets of feedback taps) when a fixed number of iterations is reached; at the same time, store a current state value for the LFSR. The stored state value may be recalled when the algorithm switches back to the LFSR, allowing the LFSR to proceed to the next logical state. The table of FIG. 4 shows an example of periodic switching between an exemplary M=2 different LFSRs in which the switching is done after every iteration. In fact, the switching may mislead a potential hacker to believe that an algorithm other than LFSRs is being used. Referring to FIG. 4, note that the same key may be re-generated after X iterations where $X<2^n-1$; however, the pseudo-random number sequence is not periodic with period p=X. This may be seen in Table 3 by noting that the value 100 is generated on iterations 2 and 5; however, the PRNG has period 2*7=14, and is not periodic with period 3. Again, the use of periodic switching among one or more LFSRs reduces the correlation between consecutive or successive outputs of an LFSR.

The behavior of the LFSRs may be further concealed by applying a nonlinear operator such as an exemplary XOR operator to the pseudo-random number generated by the techniques described in FIGS. 3 and 4. In reference to the LFSR switching technique described in FIG. 4, the pseudo-random number may be XORed with a different operand or binary sequence corresponding to each LFSR used. For example, if a 3 bit LFSR is used, a first distinct 3 bit binary number such as (0, 1, 1) may be used as the operand for a first LFSR while a second distinct 3 bit binary number such as (1, 0, 1) may be used as the operand for a second LFSR. If the nonlinear operators are carefully chosen to map every input value to a different output value, then the nearly white distribution of the input to the nonlinear operator will be preserved at its output.

Figure 5:
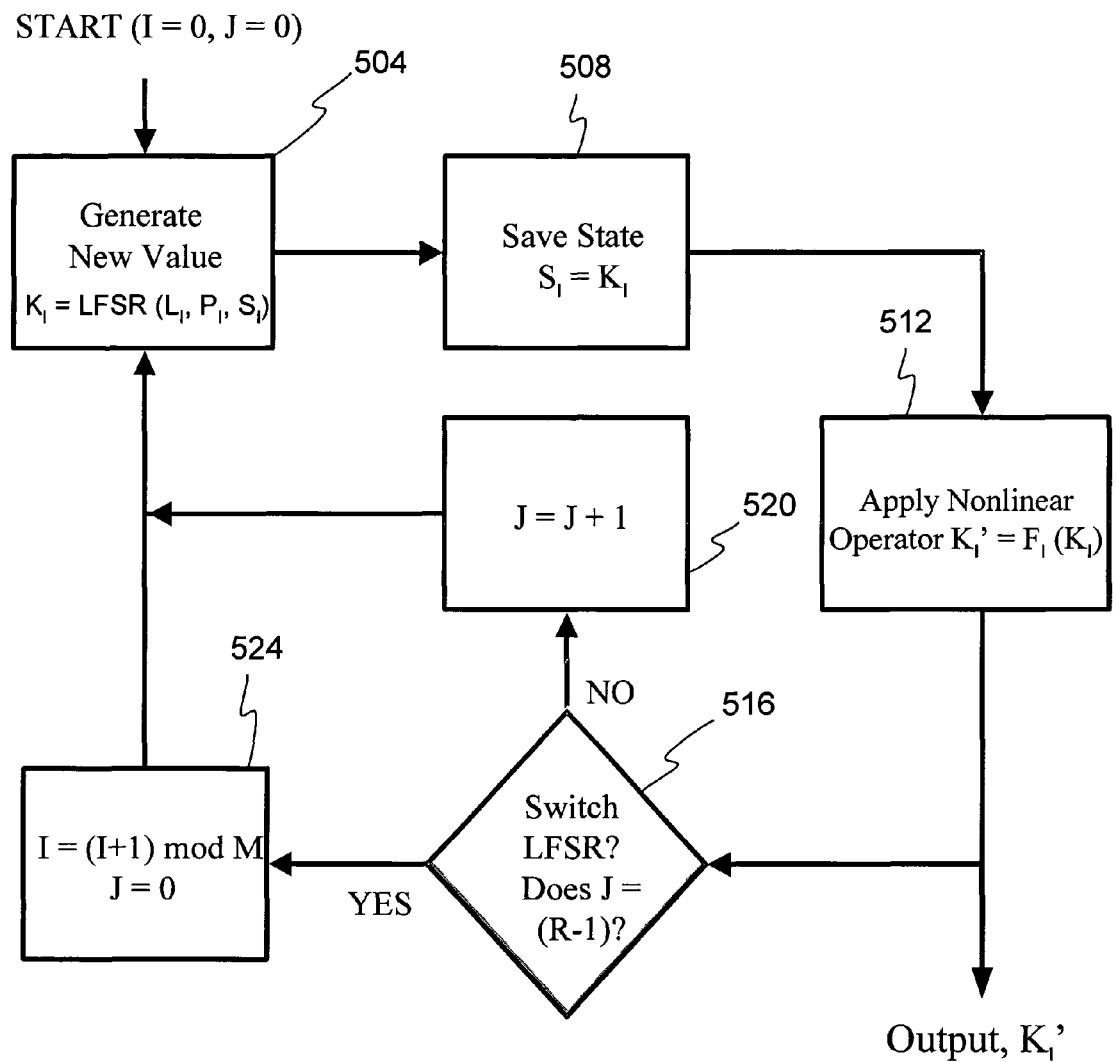
FIG. 5 illustrates an operational flow diagram of a PRNG that incorporates the techniques previously described in accordance with an embodiment of the invention.

FIG. 5 illustrates an operational flow diagram of a PRNG that incorporates the techniques previously described in accordance with an embodiment of the invention. Pseudo-random numbers may be generated by periodically sampling M distinct LFSRs, in which switching from one LFSR to the next LFSR is performed after every R iterations of each LFSR. Further, each LFSR may generate an output, $K_I$, by way of sampling every $L_I$ iterations. In addition, a nonlinear operator, $F_I$ may be applied that is unique to the LFSR being used in order to generate a final pseudo-random number, $K_I'$. By way of choosing appropriate feedback tap parameters to insure the maximal length property for each of the LFSRs employed, the pseudo-random numbers generated by this PRNG will have nearly white noise characteristics. The PRNG will be characterized by a periodicity of $M*(2^n-1)$ where n is the number of bits as shown in the following table of variables:

| | Variables |
|---|---|
| I | Placeholder or counter to determine which LFSR is being used |
| J | Placeholder for the number of iterations that have been generated with a particular LFSR (used as a counter to determine when switching to next LFSR should occur) |
| LFSR ($L_I$, $P_I$, $S_I$) | The result of periodic sampling ($L_I$ samples) of an LFSR starting from a state of $S_I$ and using feedback taps $P_I$ |
| M | Number of different LFSRs |
| $L_0, \ldots, L_{M-1}$ | Sampling period (no. of iterations before the output is sampled) for the Ith LFSR |
| $P_0, \ldots, P_{M-1}$ | The feedback taps for the Ith LFSR |
| $F_0, \ldots, F_{M-1}$ | Nonlinear operator for the Ith LFSR |
| $S_0, \ldots, S_{M-1}$ | Current state for the Ith LFSR |
| R | Number of iterations before switching to next LFSR |
| $K_I$ | Pseudo-random number |
| $K_I'$ | Final Pseudo-random number |

Referring to FIG. 5, at step 504, a first of M LFSRs generates a pseudo-random number, $K_I$, as a function of the sampling period of the Ith LFSR, the configuration of feedback taps for the Ith LFSR, and the current state of the Ith LFSR. The values for the placeholders (or counters), I, and J, are initialized to zero. Next, at step 508, the new state is saved as the current state, i.e., $S_I=K_I$. At step 512, a non-linear operator, $F_I$, is applied to the operand, the pseudo-random number, $K_I$, to generate $K_I'$. Next, at step 516, the placeholder J is evaluated to determine whether the next LFSR should be used. If J is equal to the value (R−1), then the LFSR is switched as indicated at step 524. Otherwise, at step 520, J is incremented by one and the next pseudo-random number is generated. At step 524, the LFSR is switched to the LFSR designated by I=(I+1)Mod M while the placeholder J is reset to zero.

Figure 6:
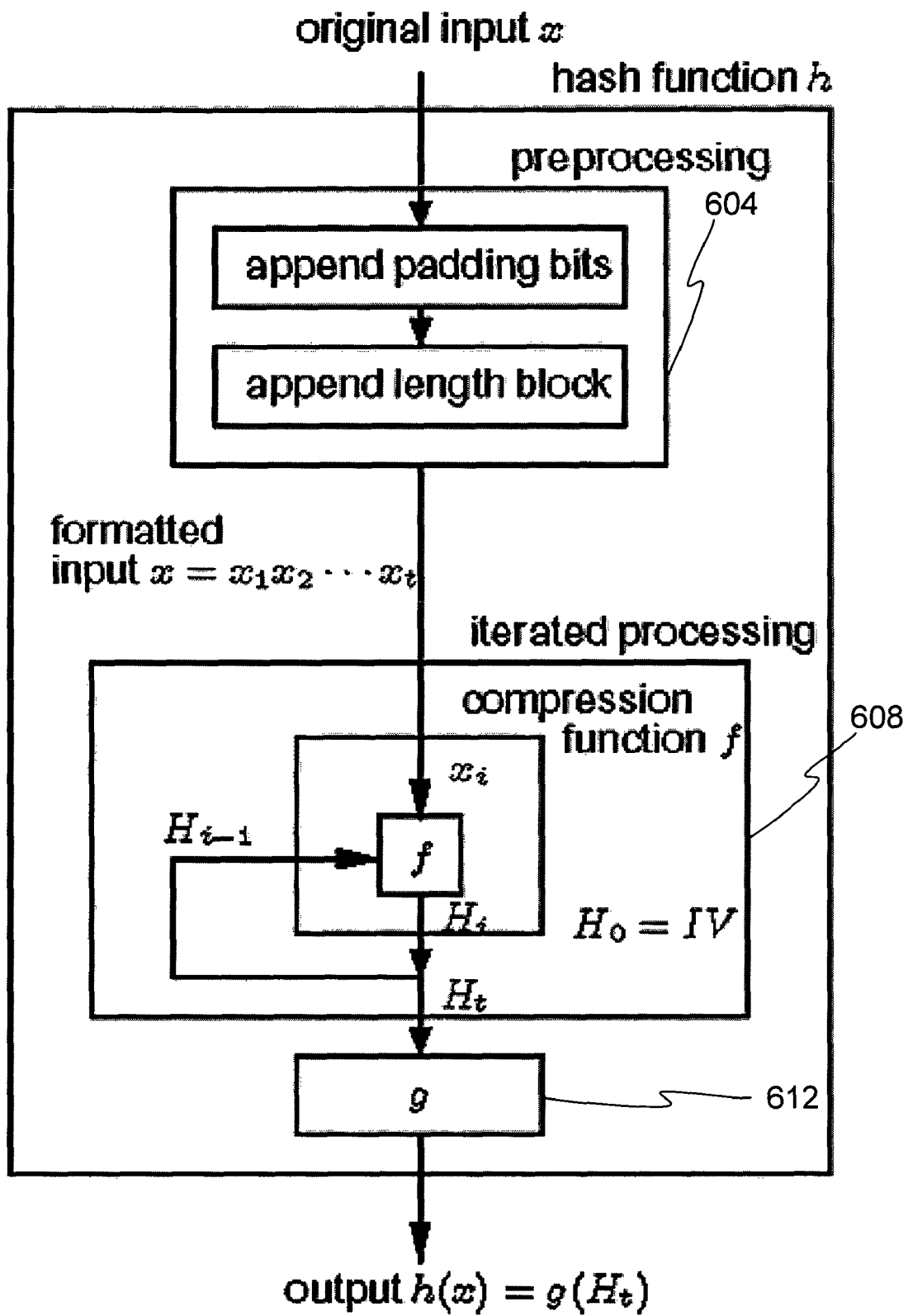
FIG. 6 illustrates a functional block diagram of a typical hash function, h, used to further encrypt a pseudo-random number in accordance with an embodiment of the invention.

FIG. 6 illustrates a functional block diagram of a typical hash (or hashing) function, h, used to further encrypt a pseudo-random number in accordance with an embodiment of the invention. As illustrated, the output of the PRNG can be used as the hash input, x. The hash input, x, is of arbitrary finite length and can be divided into fixed-length r-bit blocks $x_i$ for which i=1, . . . , t. This preprocessing, occurring at a preprocessor 604, typically involves appending extra bits (padding) as necessary to attain an overall bit length which is a multiple of the block length r and/or including a block or partial block indicating the bit length of the unpadded input. An internal fixed-size hash function or compression function, f, 608 may be used to compute $H_i$, a new intermediate result having bit length, n', for example, as a function of the previous n' bit intermediate result ($H_{i-1}$) and the input block $x_i$. The general process of an iterated hash function is shown in FIG. 6 in which the input x={$x_1, x_2, \ldots, x_t$}. The hashing function may be represented mathematically as follows:

$$H_0=IV; H_i=f(H_{i-1}, X_i), 1 \leq i \leq t, h(x)=g(Ht).$$

$H_{i-1}$ serves as the n'-bit chaining variable between stage i−1 and stage i, while $H_0$ is a pre-defined starting value or initializing value (IV). An optional output transformation function, g, 612 may be used as a final step to map the n'-bit chaining variable to an m-bit result $g(H_t)$.

The use of a hashing function for scrambling is well known; however, the initial value of the hashing function (IV) is often a constant value. A simple method to add a time varying element to the hashing function in order to further conceal the hashing function (or underlying algorithm used) is to make the hashing function dependent upon the configuration of the feedback taps of the LFSR used by the PRNG in generating a particular pseudo-random number. For example, the initial value (IV) may be computed as a function, w, operating on a variable such as the configuration of the feedback taps $P_f$, of its associated LFSR, i.e. $IV=w(P_f)$. The configuration of the feedback taps may vary over time, for example, when periodic LFSR switching is performed. As a consequence, the initial value (IV) of the hashing function will vary over time and will depend on the LFSR currently used. It is contemplated that the function w may be a function that operates on other variables such as the iteration number or current output state of a LFSR.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of generating pseudo-random numbers using linear feedback shift registers in which the correlation between successive pseudo-random numbers is reduced, said method comprising periodically switching between iterative outputs generated by at least a first linear feedback shift register and iterative outputs generated by at least a second linear feedback shift register.

2. The method of claim 1 wherein said pseudo-random numbers are generated with a period equal to the sum of each of the individual linear feedback shift register periods.

3. The method of claim 2 wherein said pseudo-random numbers are generated with a period equal to the sum of each of the individual linear feedback shift register periods.

4. The method of claim 2 wherein said pseudo-random numbers are generated with a period equal to the sum of each of the individual linear feedback shift register periods.

5. The method of claim 1 further comprising:
   receiving said pseudo-random number generated from said linear feedback shift register; and
   varying the initial value of said hashing function over time by way of a function operating on one or more variables.

6. The method of claim 5 wherein said one or more variables comprises the configuration of feedback taps associated with said linear feedback shift register.

7. A method of further encrypting a pseudo-random number generated from a linear feedback shift register by using a hashing function comprising:
   receiving said pseudo-random number generated from said linear feedback shift register; and
   varying the initial value of said hashing function over time by way of a function operating on one or more variables.

* * * * *